US010718320B1

(12) United States Patent
Note

(10) Patent No.: US 10,718,320 B1
(45) Date of Patent: Jul. 21, 2020

(54) HIGH PRESSURE AXIAL PISTON PUMP WITH MULTIPLE DISCHARGE PORTS

(71) Applicant: Clayton Note, Eagle Point, OR (US)

(72) Inventor: Clayton Note, Eagle Point, OR (US)

( * ) Notice: Subject to any disclaimer, the term of this patent is extended or adjusted under 35 U.S.C. 154(b) by 134 days.

(21) Appl. No.: 15/898,742

(22) Filed: Feb. 19, 2018

Related U.S. Application Data

(60) Provisional application No. 62/482,448, filed on Apr. 6, 2017.

(51) Int. Cl.
| | | |
|---|---|---|
| *F04B 1/2064* | (2020.01) | |
| *F04B 27/08* | (2006.01) | |
| *F04B 1/2042* | (2020.01) | |
| *F04C 15/06* | (2006.01) | |
| *F16H 61/00* | (2006.01) | |
| *F04C 14/22* | (2006.01) | |
| *F01C 1/067* | (2006.01) | |

(52) U.S. Cl.
CPC .......... *F04B 1/2064* (2013.01); *F01C 1/067* (2013.01); *F04C 14/223* (2013.01); *F04C 15/06* (2013.01); *F16H 61/0025* (2013.01); *F04B 1/2042* (2013.01); *F04B 27/086* (2013.01); *F04C 2240/30* (2013.01)

(58) Field of Classification Search
CPC .......... F04B 1/20; F04B 1/324; F04B 1/2064; F04B 7/0038; F04B 27/086; F04B 27/0804; F04B 27/0839; F04C 14/223; F04C 15/06; F16H 61/0025
See application file for complete search history.

(56) References Cited

U.S. PATENT DOCUMENTS

| | | | |
|---|---|---|---|
| 1,961,769 A | 10/1930 | Kollberg | |
| 3,093,081 A * | 6/1963 | Budzich | F04B 1/20 417/216 |
| 3,679,328 A * | 7/1972 | Cattanach | F04B 1/145 417/270 |
| 4,549,466 A * | 10/1985 | Hoashi | F04B 1/2042 60/421 |
| 5,245,970 A | 9/1993 | Lwaszkiewicz et al. | |
| 6,439,200 B1 | 8/2002 | Majewski et al. | |
| 6,467,457 B1 | 10/2002 | Lei et al. | |
| 6,531,089 B1 * | 3/2003 | Brungs | B22F 3/1125 419/28 |
| 6,718,935 B2 | 4/2004 | Meisner et al. | |
| 7,124,628 B2 | 10/2006 | Wildman | |

(Continued)

*Primary Examiner* — Philip E Stimpert
(74) *Attorney, Agent, or Firm* — Jerry Haynes Law

(57) ABSTRACT

A high pressure axial piston pump displaces high pressure, high volume fluid into a 1994-2003 7.3 liter power stroke or T444E International engine. A pump housing forms a central borehole, an intake port, and two discharge ports angled about 122 degrees from each other and in fluid communication with engine. A drive shaft rotates a cylinder block about an axis of rotation. A cam is tilted at an angle relative to axis of rotation. Multiple pistons, having a cam end and a block end, reciprocate through cylinder block. The cam end is constrained to follow surface of cam. When pistons move proximally to tilted cam, the block end restricts intake of fluid, and cam end enables discharge of fluid. When pistons move distally from tilted cam, the block end enables intake of fluid, and cam end restricts passage through discharge ports. The pump is fabricated from billet aluminum material.

19 Claims, 7 Drawing Sheets

(56) References Cited

U.S. PATENT DOCUMENTS

| | | |
|---|---|---|
| 7,354,253 B2 | 4/2008 | Yamauchi et al. |
| 8,910,610 B2 | 12/2014 | Thayer |
| 8,956,133 B2 | 2/2015 | Ogata et al. |
| 2006/0275147 A1 | 12/2006 | Stecher |

* cited by examiner

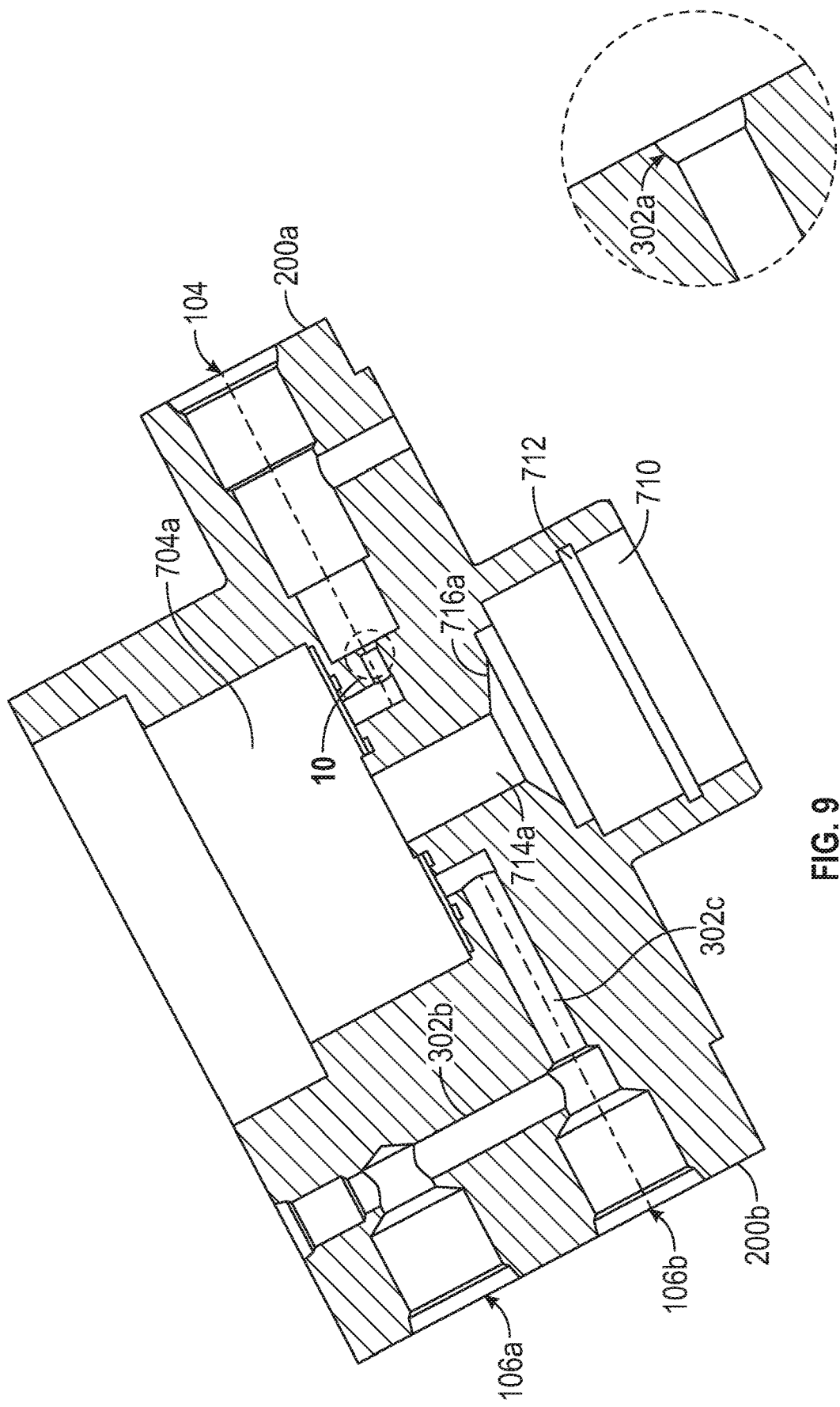

HIGH PRESSURE AXIAL PISTON PUMP WITH MULTIPLE DISCHARGE PORTS

CROSS-REFERENCE OF RELATED APPLICATIONS

This application claims the benefits of U.S. provisional application no. 62/482,448, filed Apr. 6, 2017 and entitled HIGH PRESSURE AXIAL PISTON PUMP FOR 1994 TO 2003 7.3 LITER POWER STROKE OR T444E INTERNATIONAL ENGINE, which provisional application is incorporated by reference herein in its entirety.

FIELD OF THE INVENTION

The present invention relates generally to a high pressure axial piston pump with multiple discharge ports. More so, the present invention relates to an axial piston oil pump that forcibly and variably displaces high volumes and pressures of oil into the injectors of a 7.3 liter power stroke engine or a T444E International engine manufactured from 1994 to 2003 through two discharge ports, rather than one discharge port, which feed directly into the injectors of the engines, and which are angled about 122° away from each other.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, an axial piston pump is a positive displacement pump that has a number of pistons in a circular array within a cylinder block. It can be used as a stand-alone pump, a hydraulic motor or an automotive air conditioning compressor. The axial piston pump has a number of pistons arranged in a circular array within a cylinder block which is commonly referred to as a cylinder block, rotor or barrel. This cylinder block is driven to rotate about its axis of symmetry by an integral shaft that is, more or less, aligned with the pumping pistons.

Often, axial piston pumps include a cam, referred to as a swashplate or tilt plate, against which the axial piston ends bear and around which such ends rotate with the angled surface of the swashplate. This allows a cyclic reciprocal movement of the pistons providing each cylinder with low pressure intake and high pressure discharge of hydraulic fluid on each rotation. The oil or hydraulic fluid being pumped from the axial piston pump is generally discharged through a single outlet. This feeds the fluid into oil rails, before entering the injector of the engine.

Generally, billet aluminum is fabricated in a conventional aluminum extrusion operation. In a typical manufacturing process, aluminum stock in the form of large logs, perhaps 5" to 16" in diameter and up to 20' to 24' in length are fed on a conveyor through an elongated furnace, where they are heated continuously to about 800° to 950° Fahrenheit. After heating, the logs are cut into short lengths called billets, which are fed immediately into an extruder, while the billets are hot. The extruder includes a ram that presses the billets through a die that forms the aluminum into extrusions of a desired shape. The extrusions can then be cut into desired lengths. The billets are cut to specific lengths, depending upon the particular part being extruded.

Other proposals have involved displacing fluids through an axial piston pump at high volumes and pressures. The problem with these axial piston pumps is that they do not provide enough outlets for the discharged fluid. Also, the construction material is not conducive to operate the pump with minimal noise. Self-priming can also be problematic with the prior art axial piston pumps. Even though the above cited axial piston pumps meets some of the needs of the market, a high pressure axial piston pump with two discharge ports angled at a 122° angle away from each other, which is operational with a 7.3 liter power stroke engine or T444E International engine manufactured from 1994 to 2003, and which is fabricated from integral billet aluminum material, is still desired.

SUMMARY

Illustrative embodiments of the disclosure are generally directed to a high pressure axial piston pump fabricated from billet aluminum material, and having two discharge ports disposed at an angle of about 122° away from each other, and being operational with a 7.3 liter power stroke engine or T444E International engine manufactured from 1994 to 2003.

In some embodiments, the axial piston pump comprises a pump housing that protectively encapsulates, and segregates different components of the axial piston pump. The pump housing forms a central borehole for receiving a rotatable drive shaft, an intake port for receiving a fluid, and two discharge ports for discharging the fluid into the engine. The axial piston pump further comprises a cylinder block, concentrically disposed in the pump housing. The cylinder block is defined by multiple piston chambers arranged in a circular array around the central borehole. The pump housing and the cylinder block may be fabricated from an integral billet aluminum material.

A fluid supply line, carrying a fluid such as motor oil, is in fluid communication with the intake port. The fluid supply line supplies the fluid to the intake port in the pump housing. Multiple delivery lines are arranged in fluid communication with the fluid supply line. The delivery lines carry the fluid through the pump housing, from the intake port to the discharge ports. The discharge ports are oriented about 122° away from each other along a plane, so as to optimize the volume and pressure of fluid entering the engine. Furthermore, the use of two, rather than one, discharge ports serve to discharge the fluid into the injectors of the engine at high pressures, and high volumes.

A drive shaft rotates the cylinder block about an axis of rotation. A tilted cam is disposed inside the cylinder block. The tilted cam may be fixed at a tilted angle, or may variably tilt at an angle relative to the axis of rotation. A plurality of pistons is axially disposed through the piston chambers of the cylinder block. The pistons are defined by a cam end and a block end. The cam end of the pistons is constrained to follow the surface of the tilted cam, allowing a cyclic reciprocal movement of the pistons. Thus, as the cylinder block rotates, the pistons reciprocate in a sinusoidal axial motion.

In this manner, when the pistons move proximally to the tilted cam, the block end of the piston restricts passage of the fluid through the intake port, and the cam end of the piston enables passage of the fluid through the discharge outlets. Further, when the pistons move distally from the tilted cam, the block end of the piston enables free passage of the fluid through the intake port, and the cam end of the piston restricts passage of the fluid through the discharge ports.

One objective of the present invention is to provide a high pressure axial piston pump that pumps motor oil and hydraulic fluids into a 7.3 liter power stroke engine or T444E International engine manufactured from 1994 to 2003 at high pressures and volumes.

Another objective is to provide two discharge ports that enable efficient passage of fluid to be discharged into oil rails that feed an injector, such that two discharge ports, rather than one, enable greater pressure and volume discharge of the fluids.

Another objective is to orient the discharge ports about 122° away from each other along a plane, so as to more uniformly discharge the fluid into the engine, create a self-priming mode, and optimize the volume and pressure of fluid entering the engine.

Another objective is to provide a high pressure axial piston pump configured to operate with a 7.3 liter power stroke engine or T444E International engine manufactured from 1994 to 2003.

Another objective is to enhance the structural integrity of the high pressure piston pump through construction with an integral aluminum billet material.

Yet another objective is to operate the pump with minimal noise.

Yet another objective is to operate the pump such that it operates at a high self- priming mode.

Yet another objective is to reduce the weight, size, and cost of an axial piston pump.

Yet another objective is to provide an inexpensive to manufacture high pressure axial piston pump.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 9 illustrates a sectioned side view of the pump housing, the section taken along section B-B of FIG. 8, detailing multiple delivery lines between the intake port and the discharge ports, in accordance with an embodiment of the present invention; and FIG. 10 illustrates a close up view of a first delivery line integral with the intake port, the section taken from encircled area C of FIG. 9, in accordance with an embodiment of the present invention.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
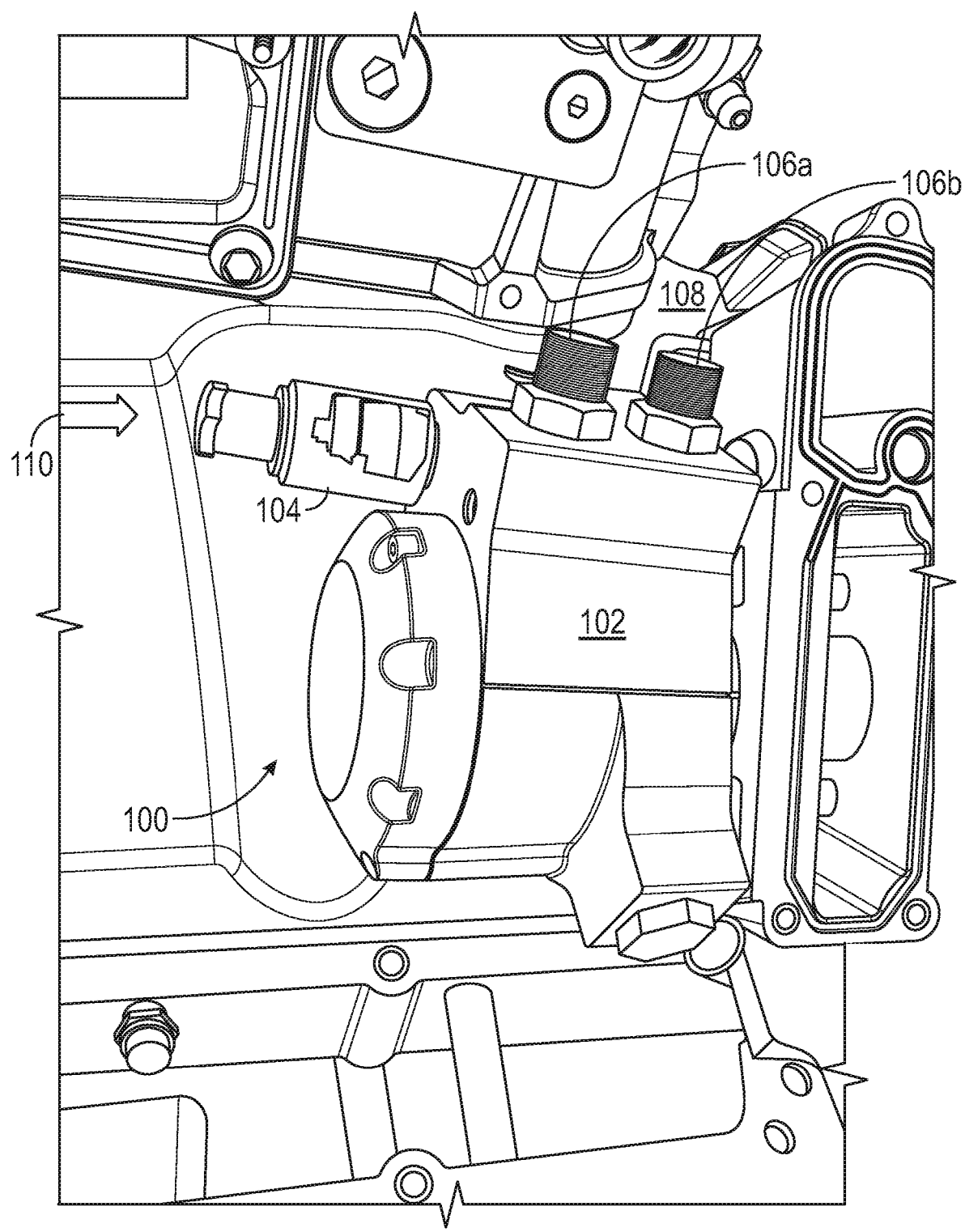
FIG. 1 illustrates a perspective view of an exemplary high pressure axial piston pump coupled to a 7.3 liter power stroke engine or a T444E International engine fabricated from 1993 to 2003, in accordance with an embodiment of the present invention.

As referenced in FIG. 1, a high pressure axial piston pump 100 with multiple discharge outlets is operational with a 7.3 liter power stroke engine, or T444E International engine that is manufactured from 1994 to 2003. The high pressure axial piston pump 100, hereafter "pump 100" is unique in that two discharge ports 106a-b, rather than one discharge port, are used for discharging a fluid 110 into the engine 108. The use of two discharge ports 106a-b allows for the displacement of high volumes and pressures of motor oil into the injectors of the engine 108. Further, the disposition of the discharge ports at a 122° angle away from each other enables the axial piston pump to variably displace high volumes and pressures of motor oil into the injectors of the engine. This works to enhance self-priming of the pump 100. The angled disposition of the two discharge ports 106a-b is also effective for increasing the volume and rate discharge of the fluid 110, which creates a more efficient engine 108. The construction of the pump 100 from integral billet aluminum material enhances structural integrity of the pump 100, and reduces noise during operation.

Figure 2:
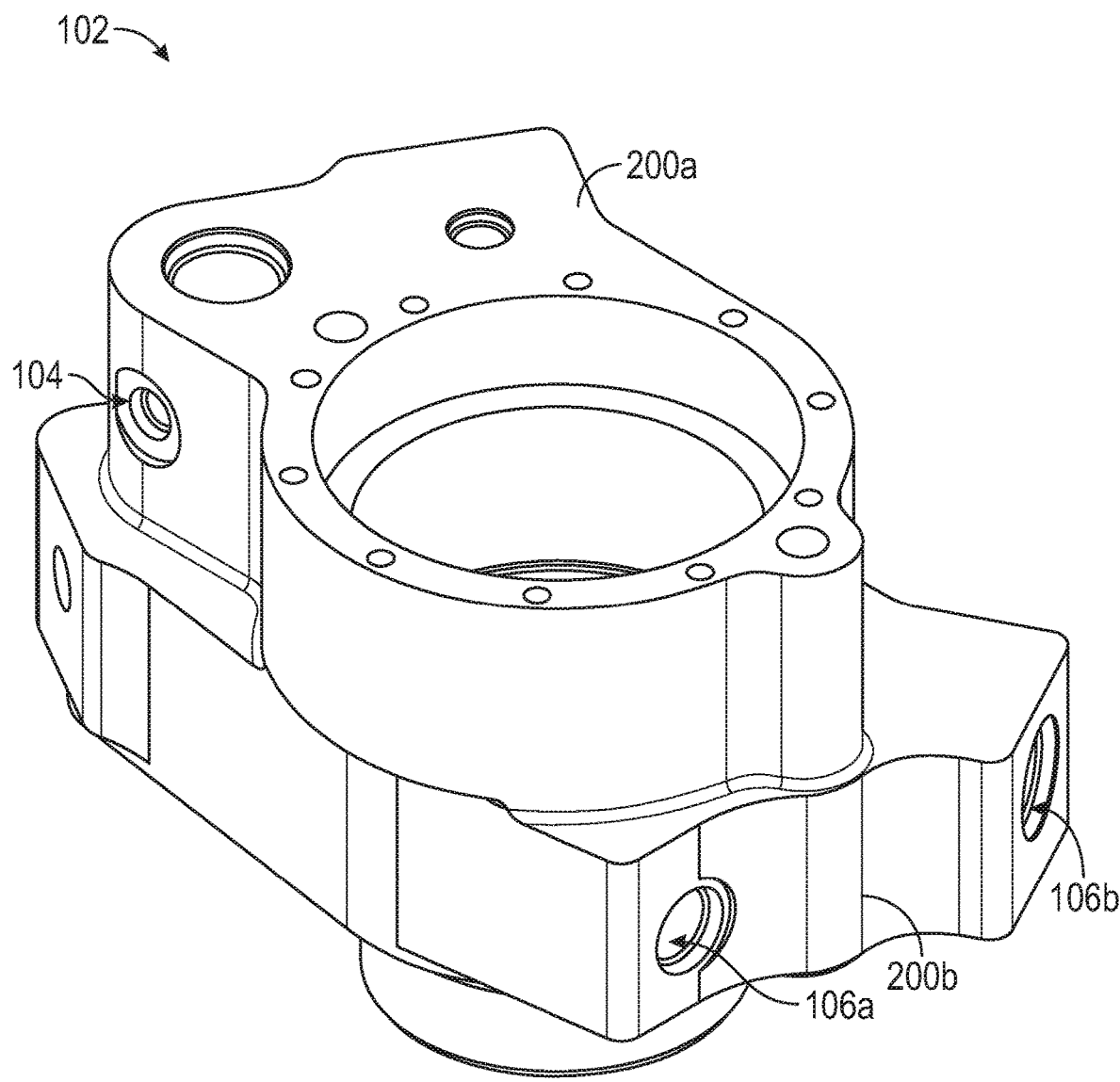
FIG. 2 illustrates a perspective view of an exemplary pump housing, forming an intake port and two discharge ports, in accordance with an embodiment of the present invention.

As illustrated in FIG. 2, the pump 100 comprises a pump housing 102 defined by an intake end 200*a* and a discharge end 200*b*. The pump housing 102 is configured to protectively house, and segregate other components described below. In one embodiment, the pump housing 102 has a generally cylindrical shape. Though in other embodiments, other shapes may be used. In some embodiments, the pump housing 102 may be fabricated from an integral billet aluminum material. As discussed below, use of billet aluminum enhances the structural integrity of the pump housing 102 and helps reduce operational noise.

Figure 3:
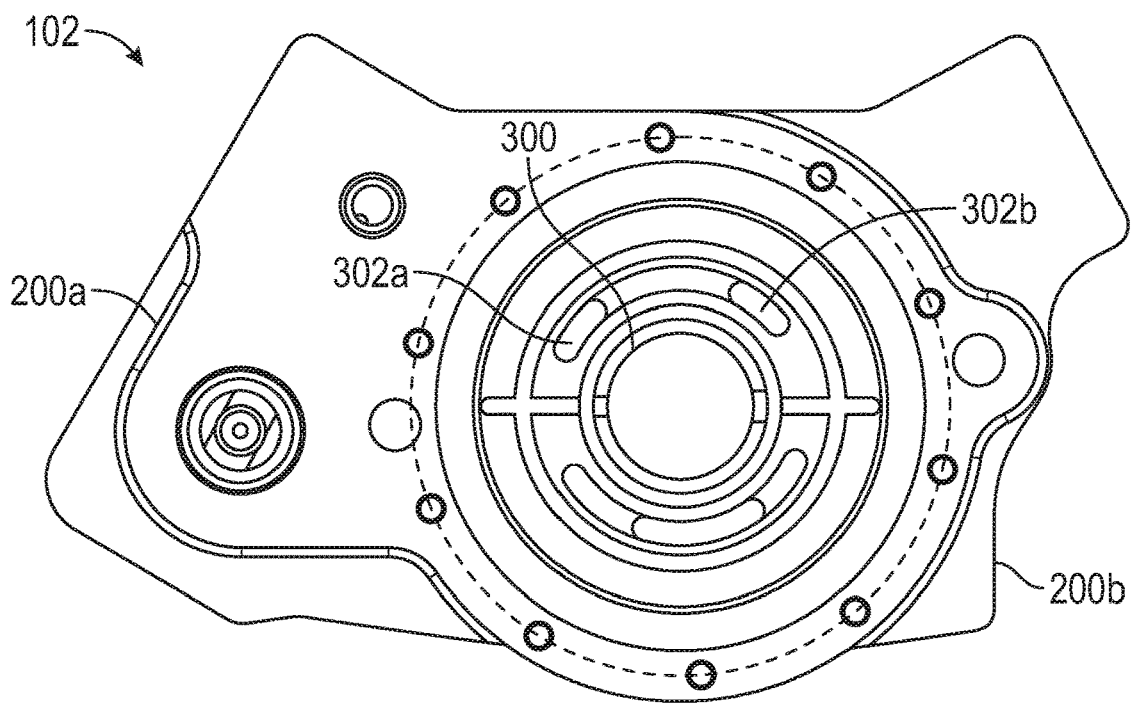
FIG. 3 illustrates a top view of the pump housing shown in FIG. 2, in accordance with an embodiment of the present invention.

As FIG. 3 illustrates, the pump housing 102 is defined by a central borehole 300. The central borehole 300 runs concentrically through the pump housing 102. In some embodiments, a rotatable drive shaft 706 is concentrically disposed through the central borehole 300. As discussed below, the rotatable drive shaft 706 rotates inside the central borehole 300 to rotatably drive a cylinder block 700.

Figure 4:
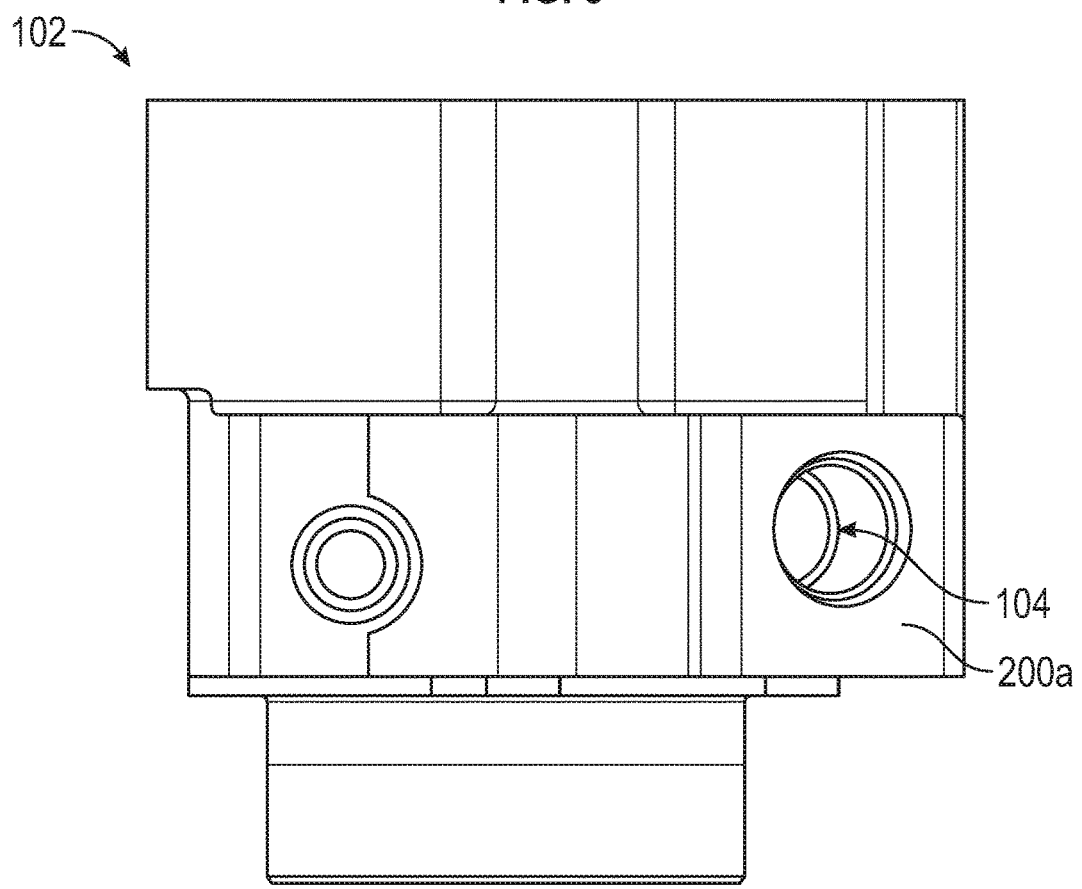
FIG. 4 illustrates a left side view of the pump housing shown in FIG. 2, in accordance with an embodiment of the present invention.

Turning now to FIG. 4, the intake end 200*a* of the pump housing 102 is defined by at least one intake port 104, through which the fluid 110 is introduced into the pump housing 102. The intake port 104 forms a circular aperture integral with the pump housing 102. The intake port 104 may include a suction intake port 104, since the reciprocating piston-action creates a sucking effect on the fluid. In some embodiments, a fluid supply line (not shown), which is in fluid communication with the intake port 104, supplies the fluid 110 to the intake port 104.

In addition to the fluid supply line, multiple delivery lines 302*a*-*c* are arranged in communication with the fluid supply line and the two discharge ports 106*a*-*b*. The delivery lines 302*a*-*c* are arranged to carry the fluid 110 from the intake port 104 to the two discharge ports 106*a*-*b*. Thus, the intake port 104 enables fluid 110 to be sucked in from the fluid supply line and into the delivery lines 302*a*-*c* within the pump housing 102. In one non-limiting embodiment, the intake port 104 has a diameter of about ½".

In this regard, FIG. 10 illustrates a close up view of a first delivery line 302*a* integral with the intake port 104 for carrying the fluid 110 from the fluid supply line into the pump housing 102. Furthermore, FIG. 9 is illustrative of a second delivery line carrying the fluid 110 through the pump housing 102; and a third delivery line 302*c* carrying the fluid 110 to the two discharge ports 106*a*-*b*. In other embodiments, more delivery lines may be used, depending on the required pressure and volume displacement of fluid.

In some embodiments, the fluid 110 may include motor oil or a hydraulic fluid known in the art for operation and lubrication of a 1994-2003, 7.3 liter power stroke engine or a T444E International engine. The fluid 110 may also include any petroleum based compositions. The fluid 110 has sufficient viscosity to flow through the various ports and delivery lines taught in the present embodiment.

Figure 5:
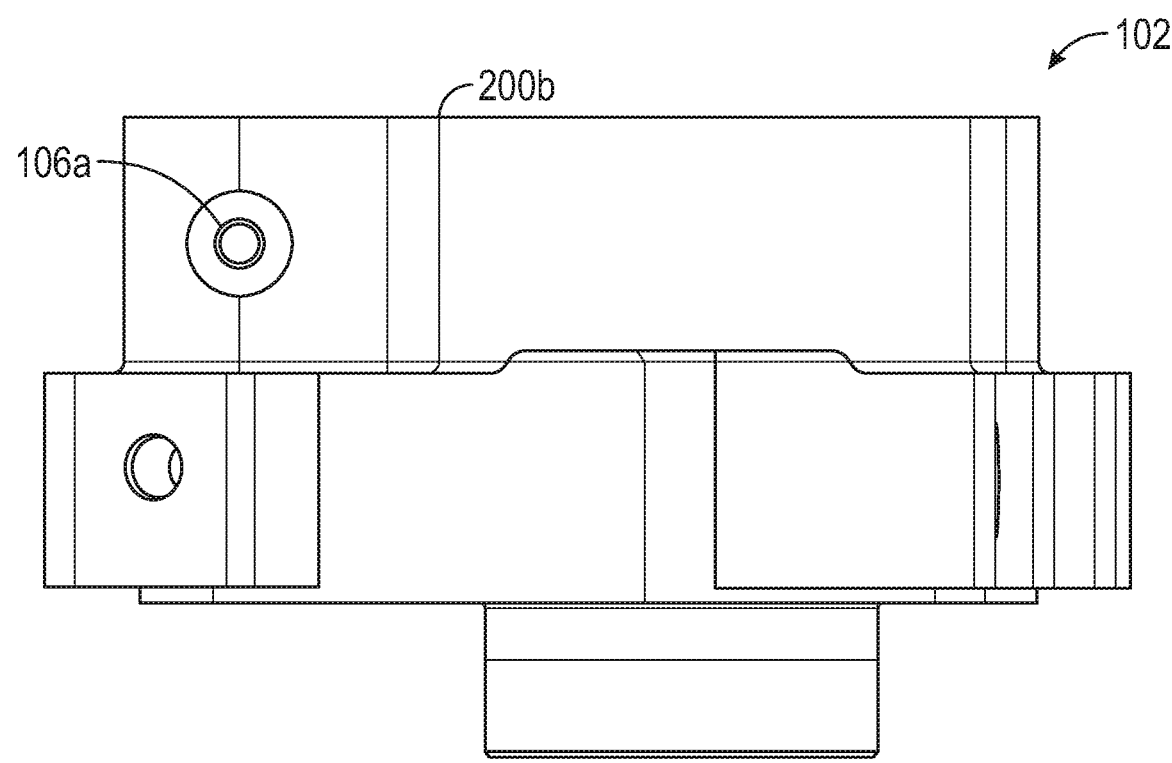
FIG. 5 illustrates a right side view of the pump housing shown in FIG. 2, in accordance with an embodiment of the present invention.

As FIG. 5 references, the discharge end 200*b* of the pump housing 102 is also defined by a plurality of discharge ports 106*a*-*b*, through which the fluid 110 is discharged into the engine 108. The discharge ports 106*a*-*b* form circular apertures integral with the pump housing 102. In one non-limiting embodiment, the discharge ports 106*a*-*b* have a diameter of about ½".

Figure 8:
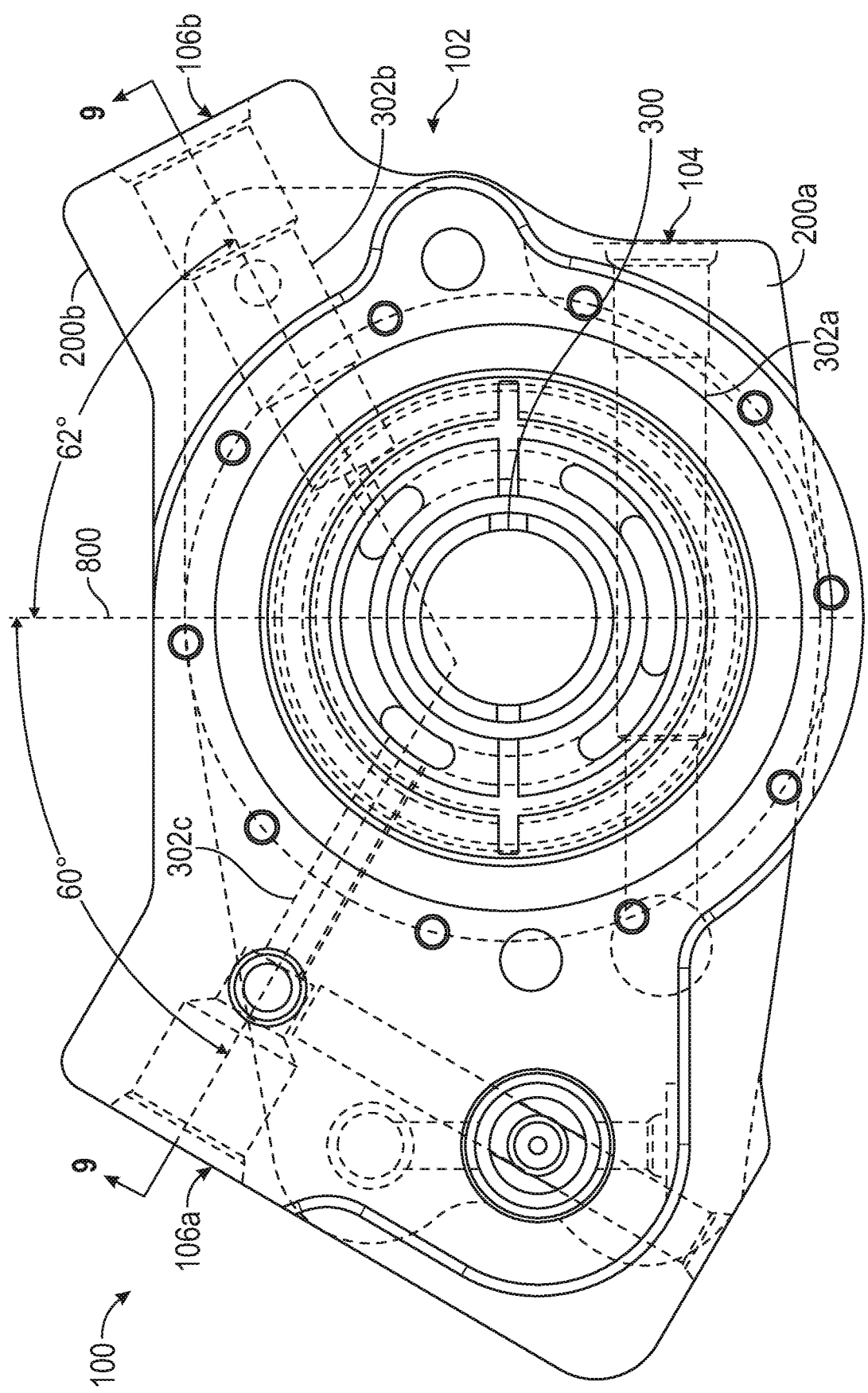
FIG. 8 illustrates a sectioned top view of the pump housing shown in FIG. 2, in accordance with an embodiment of the present invention.

In one non-limiting embodiment shown in FIG. 8, the discharge ports 106*a*-*b* are oriented about 122° from each other along a plane 800. By angling the discharge ports 106*a*-*b* away from each other, rather than parallel to each other, the displacement pressure and volume of the fluid being discharged increases. This is partially because the oil rails and injectors in the engine 108 can be positioned further away from each other, and thereby disperse the fluid more uniformly into the inner workings of the engine 108. This also works to enable a self-priming mode for the pump 100.

In some embodiments, multiple delivery lines 302*a*-*c* form integral relationships with the ports 104, 106*a*-*b*, and run through the pump housing 102. The delivery lines 302*a*-*c* are in fluid communication with the fluid supply line to receive the fluid 110, and also carry the fluid 110 from the intake port 104 to the discharge ports 106*a*-*b*. In one non-limiting embodiment, the discharge ports 106*a*-*b* are two discharge ports 106*a*, 106*b*. It is significant to note that by using two discharge ports 106*a*-*b*, a greater volume and pressure displacement of the fluid 110 is possible. Though in other embodiments, the pump 100 may utilize more than two discharge ports.

In one embodiment shown in FIG. 8, the two discharge ports 106*a*-*b* extend at an angle from the cylinder block 700. The two discharge ports 106*a*-*b* form a friction fit relationship with two oil rails (not shown) from the engine 108. The oil rails are integral with the injector (not shown) of the engine 108, such that fluid is displaced from the two discharge ports 106*a*-*b* to the engine 108. In this manner, the fluid 110 is efficiently guided from the discharge ports 106*a*-*b* to the engine 108.

In one non-limiting embodiment, the engine 108 is a 7.3 liter power stroke engine 108 or a T444E International engine 108 manufactured from 1994 to 2003. Though in other embodiments, the engine 108 may be a similar engine 108, motor, or combustion apparatus that is manufactured approximately from the years 1994 to 2003.

In some embodiments, the pump housing 102 and the cylinder block 700 are fabricated substantially from an integral billet aluminum material. The billet aluminum material is configured to enhance the structural integrity of pump 100, and also help reduce operational noise. Those skilled in the art will recognize that billet aluminum is fabricated in a conventional aluminum extrusion operation; whereby aluminum stock in the form of large logs, perhaps 5" to 16" in diameter and up to 20' to 24' in length, are fed on a conveyor through an elongated furnace, where they are heated continuously to about 800° to 950° Fahrenheit.

After heating, the logs are cut into short lengths called billets, which are fed immediately into an extruder, while the billets are hot. The extruder includes a ram that presses the billets through a die that forms the aluminum into extrusions of a desired shape. The extrusions can then be cut into desired lengths. The billets are cut to specific lengths, depending upon the particular part being extruded. This process creates an aluminum cylinder block that can withstand high pressures, which provides great advantage when displacing high volumes and pressures of motor oil into the injectors of the engine.

Figure 6:
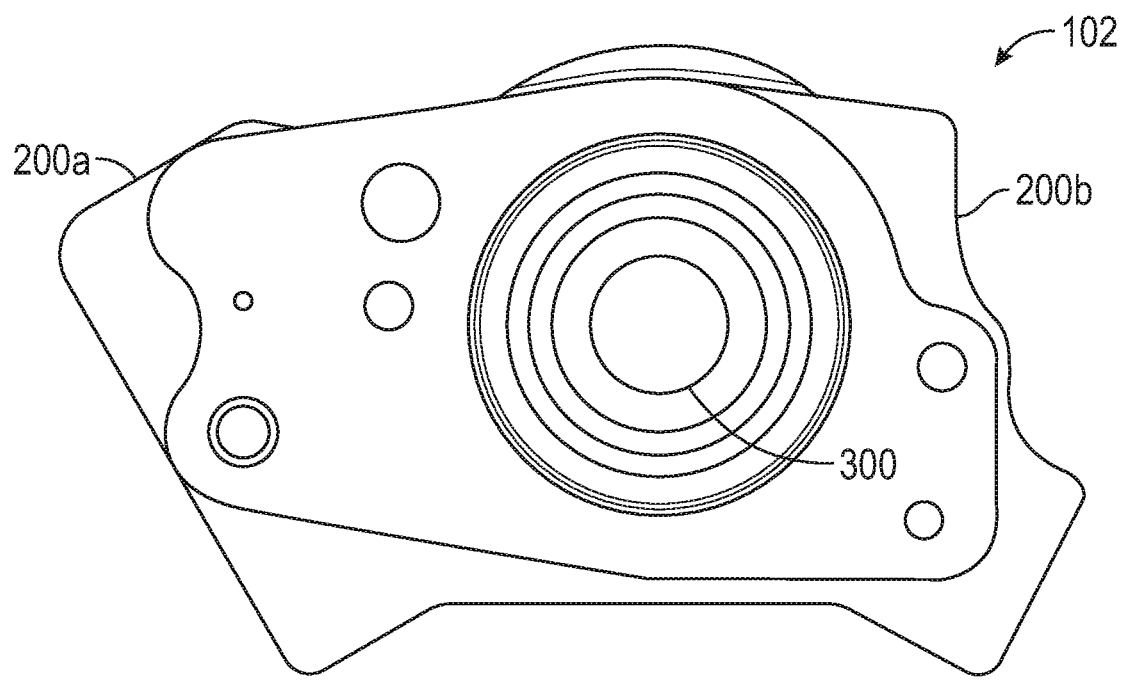
FIG. 6 illustrates a bottom view of the pump housing shown in FIG. 2, in accordance with an embodiment of the present invention.
Figure 7:
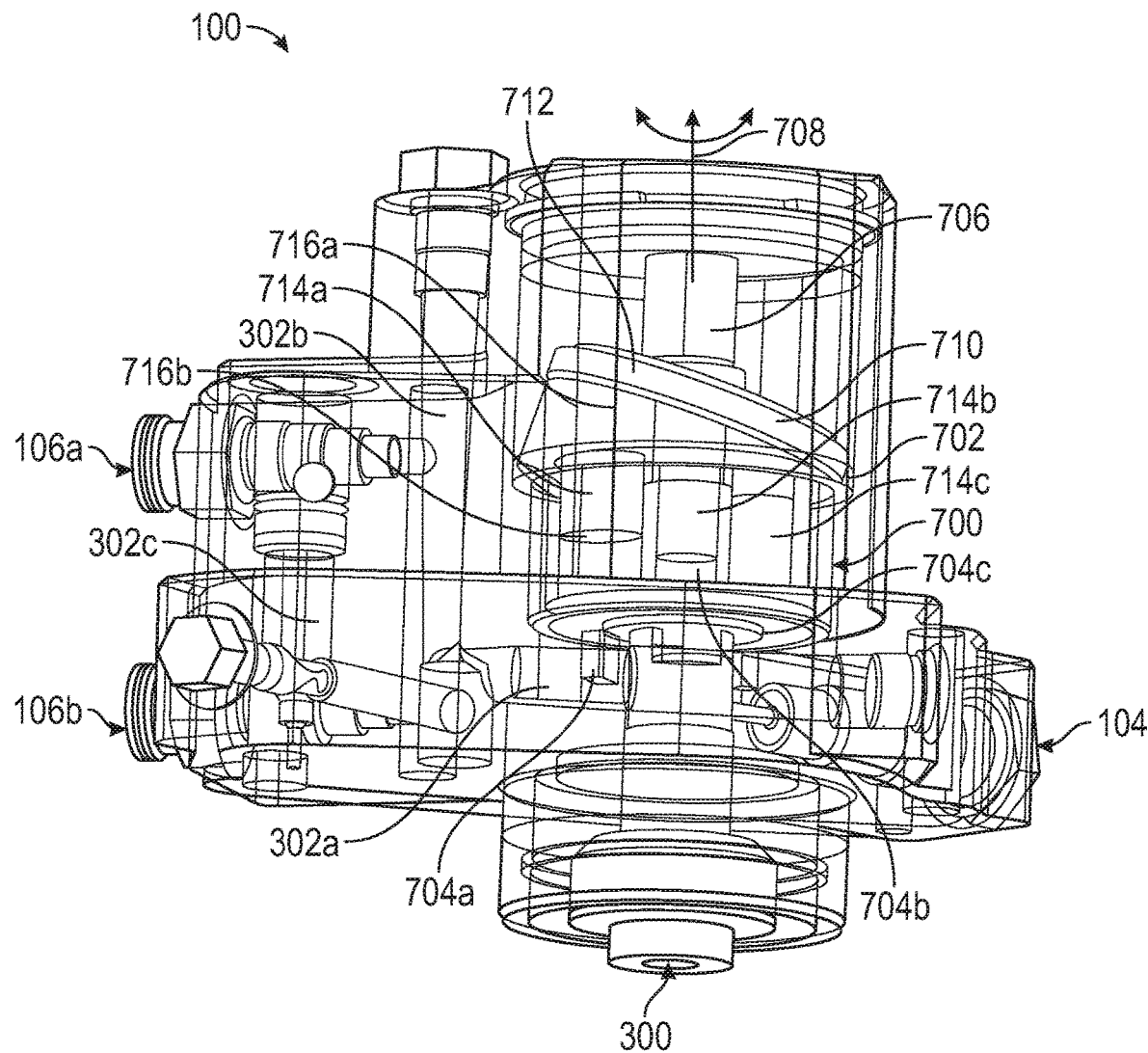
FIG. 7 illustrates a sectioned view of the high pressure axial piston pump, showing the tilted cam and pistons displacing the fluid, in accordance with an embodiment of the present invention.

Looking now at FIG. 7, the pump 100 comprises a cylinder block 700 that is concentrically disposed in the pump housing 102. In one non-limiting embodiment, the cylinder block 700 has a generally disc shape. As shown in FIG. 6, the drive shaft 706 running through the central borehole 300 works to rotatably drive the cylinder block 700 at variable speeds, so as to rotate about an axis of rotation 708. In some embodiments, the rotational speed of the drive shaft 706 has a direct correlation with the volume and pressure of fluid 110 that is being displaced through the discharge ports 106*a*-*b*.

In some embodiments, the cylinder block 700 may be defined by a plurality of piston chambers 704a-c that is arranged in a circular array around the central borehole 300. The piston chambers 704a-c serve to house and enable axial reciprocating movement by a plurality of pistons 714a-c, as described below. The piston chambers 704a-c also serve to carry the fluid 110 between the intake port 104 and the discharge ports 106a-b in conjunction with the position of the pistons 714a-c in the piston chamber 704a-c.

In some embodiments, a rotary valve 702 is disposed at the block end 716b of the pistons 714a-c. The rotary valve 702 is configured to connect the piston chambers 704a-c to the fluid supply line and the delivery lines 302a-c. The rotational position of the rotary valve 702 regulates flow of fluid 110 through the piston chambers 704a-c, the fluid supply line, and the delivery lines 302a-c.

Looking again at FIG. 7, a tilted cam 710 is disposed inside the cylinder block 700. The tilted cam 710 serves as a surface for the pistons 714a-c to ride, so as to reciprocate in a sinusoidal axial motion. Those skilled in the art will also recognize that the tilted cam 710 can include a swashplate. The tilted cam 710 is configured to be fixedly, or variedly tilted at an angle relative to the axis of rotation 708. In some embodiments, the tilted cam 710 is fixedly tilted at a predetermined angle relative to the axis of rotation 708. In this embodiment, the tilted cam 710 is provided centrally with a hub on which the rotation pivot of the tilted cam 710 is locked. In other embodiments, the angle of the tilted cam 710 is variably adjusted. Those skilled in the art will recognize that altering the angle of the tilted cam 710 serves to increase or decrease the fluid 110 displacement capacity of the pump 100.

As discussed above, the pump 100 comprises a plurality of pistons 714a-c. The pistons 714a-c are axially disposed through the piston chambers 704a-c of the cylinder block 700. In this manner, the pistons 714a-c are operable to rotate with the cylinder block 700, which is driven by the rotatable drive shaft 706. In one embodiment, five pistons may be used. Though in other embodiments, more or less pistons may be used, depending on the fluid displacement requirements.

Looking back at FIG. 7, the pistons 714a-c are defined by a cam end 716a, and a block end 716b. The cam end 716a of the piston 714a may be wider than the block end 716b, and is constrained to follow the surface 712 of the tilted cam 710. In this manner, the cam end 716a rests flush on the tilted cam 710 while rotating with the cylinder block 700. The pistons 714a-c rotate and simultaneously reciprocate through the piston chambers 704a-c in correlation with the rotational speed of the drive shaft 706. This creates a cyclic reciprocal movement of the pistons 714a-c. Thus, as the cylinder block 700 rotates, the pistons 714a-c reciprocate in a sinusoidal axial motion.

This axial motion by the pistons 714a-c creates a reciprocation cycle involving fluid 110 being displaced through the piston chambers 704a-c and discharge ports 106a-b. Thus, when a pistons 714a moves proximally to the tilted cam 710, the block end 716b of the piston 714a restricts passage of the fluid 110 through the intake port 104, and the cam end 716a of the piston 714a enables passage of the fluid 110 through the discharge ports 106a-b. The piston 714a then moves to reach a bottom of the reciprocation cycle, i.e., bottom-dead-center. At this position, the connection between the piston chamber 704a and intake port 104 is closed. Shortly thereafter, the piston chamber 704a becomes open to the discharge ports 106a-b again and the pumping cycle starts over.

Continuing with the reciprocation cycle of the piston 714a, when the piston 714a moves distally from the tilted cam 710, the block end 716b of the piston 714a enables free passage of the fluid 110 through the intake port 104, and the cam end 716a of the piston 714a restricts passage of the fluid 110 through the discharge ports 106a-b. Thus, when the piston 714a is at a top of the reciprocation cycle, i.e., top-dead-center, the connection between the trapped fluid 110 in the piston chamber 704a and the discharge ports 106a-b is closed. Shortly thereafter, that same piston chamber 704a becomes open to the intake port 104. As the piston 714a continues to rotate about the axis of rotation 708 in the cylinder block 700, the piston 714a moves proximally to the tilted cam 710; thereby increasing the volume of the trapped piston chamber 704a. As this occurs, fluid 110 enters the piston chamber 704a from the intake port 104 to fill the void.

As discussed above, adjusting the angle of the tilted cam 710 relative to the axis of rotation 708 changes the amount of fluid 110 displaced through the discharge ports 106a-b. As the pistons 714a-c rotate about the axis of rotation 708, the angle of the tilted cam 710 is varied. This tilting articulation causes the pistons 714a-c to move in and out of their respective piston chambers 704a-c. Thus, changing the angle of the tilted cam 710 causes the stroke of the pistons 714a-c to be varied continuously. In some embodiments, the angle of the tilted cam 710 may be variably adjusted.

For example, if the tilted cam 710 is tilted at a sharp angle relative to the axis of rotation 708, a substantially large volume of fluid 110 is sucked in through the intake port 104 and discharged through the two discharge ports 106a-b. If the tilted cam 710 is, however, generally perpendicular to the axis of rotation 708, a substantially negligible volume of fluid 110 is sucked in through the intake port 104. In one embodiment, the tilted cam 710 can tilt up to 10° relative to the first end of the piston 714a. As the tilted cam 710 tilts to press against the piston 714a, the angle of the tilted cam 710 causes the piston 714a to move in and out of their respective piston chamber 704a.

In one embodiment, if the tilted cam 710 is perpendicular to the axis of rotation 708, substantially no fluid 110 flows through the pump 100. In another embodiment, if the tilted cam 710 is tilted at a sharp angle, a substantially large volume of fluid 110 is pump 100ed. Consequently, high volume, high pressure displacement of fluid 110 pump 100ed per revolution of the drive shaft 706 may be varied while the pump 100 operates by varying both the rotation of the drive shaft 706 and the angle of the tilted cam 710.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A high pressure axial piston pump with a plurality of discharge ports, the pump comprising:
   a pump housing being defined by an external housing surface, a central borehole, at least one intake port and the plurality of discharge ports, the intake port enabling passage of a fluid into the pump housing, the discharge ports in a spaced apart relationship along the external housing surface and enabling discharge of the fluid from the pump housing;

whereby the plurality of discharge ports extend along respective longitudinal axes that intersect at an angle of 122 degrees in a plane;

a cylinder block being housed in the pump housing, the cylinder block being defined by a plurality of piston chambers arranged in a circular array around the central borehole;

whereby the plane is perpendicular to an axis of rotation of the cylinder block;

at least one intake delivery line and a plurality of discharge delivery lines, the intake delivery line carrying the fluid from the intake port to the piston chambers, the discharge delivery lines carrying the fluid from the piston chambers to the discharge ports; whereby the number of delivery lines is equal to the number of discharge ports, the intake delivery line having an intake port end defined by the intake port and each of the discharge delivery lines having a discharge port end defined by one of the plurality discharge ports at the external housing surface;

a rotatable drive shaft concentrically disposed through the central borehole of the cylinder block, the drive shaft driving the cylinder block to rotate about the axis of rotation;

a tilted cam disposed in the cylinder block, the tilted cam being tilted at an angle relative to the axis of rotation followed by the cylinder block; and a plurality of pistons axially disposed through the piston chambers of the cylinder block, the pistons defined by a cam end and a block end, the cam end being constrained to follow a surface of the tilted cam, enabling a cyclic reciprocal movement of the pistons, whereby as the cylinder block rotates, the pistons reciprocate in a sinusoidal axial motion, whereby when the pistons move proximally toward the tilted cam, the block end restricts passage of the fluid through the intake port, and the cam end enables passage of the fluid through the discharge outlets, whereby when the pistons move distally from the tilted cam, the block end enables free passage of the fluid through the intake port, and the cam end restricts passage of the fluid through the discharge ports.

2. The pump of claim 1, wherein the plurality of discharge ports are in fluid communication with a plurality of oil rails, whereby the discharge ports carry the fluid to the oil rails.

3. The pump of claim 2, wherein each oil rail is in fluid communication with at least one injector of an engine.

4. The pump of claim 3, wherein the engine comprises a diesel engine having an engine displacement of 7.3 liters.

5. The pump of claim 4, wherein the engine comprises a fluid supply line, the fluid supply line being in fluid communication with the intake port, the fluid supply line supplying the fluid to the intake port.

6. The pump of claim 1, wherein the intake port comprises a suction intake port.

7. The pump of claim 1, wherein the plurality of discharge ports consists of two discharge ports.

8. The pump of claim 1, wherein the plurality of discharge ports are oriented 122 degrees away from each other around the axis of rotation along the plane.

9. The pump of claim 8, wherein the pistons reciprocate through the piston cylinders in correlation with the rotational speed of the drive shaft.

10. The pump of claim 1, wherein the angle of the tilted cam is adjustably variable.

11. The pump of claim 10, wherein adjusting the angle of the tilted cam relative to the axis of rotation changes the amount of fluid displaced through the ports.

12. The pump of claim 1, wherein the cylinder block is fabricated at least partially from a billet aluminum material.

13. The pump of claim 1, wherein the fluid is a motor oil.

14. A high pressure axial piston pump with a plurality of discharge ports, the pump comprising:

a pump housing defined by a central borehole, an intake end having at least one intake port and a discharge end having the plurality of discharge ports, the intake port enabling passage of a fluid into the pump housing, the discharge ports enabling discharge of the fluid from the pump housing, the discharge ports extending along respective longitudinal axes that intersect at an angle of 122 degrees in a plane and terminating at discrete termination points at an external surface of the pump housing, the termination points being in a spaced apart relationship;

a cylinder block being housed in the pump housing, the cylinder block being defined by a plurality of piston chambers arranged in a circular array around the central borehole, the piston chambers carrying the fluid between the intake port and the discharge ports;

whereby the plane is perpendicular to an axis of rotation of the cylinder block;

multiple delivery lines carrying the fluid from the intake port to the discharge ports;

a rotatable drive shaft concentrically disposed through the central borehole of the cylinder block, the drive shaft driving the cylinder block to rotate about the axis of rotation; a tilted cam disposed in the cylinder block, the tilted cam being tilted at an angle relative to the axis of rotation followed by the cylinder block; and a plurality of pistons axially disposed through the piston chambers of the cylinder block, the pistons defined by a cam end and a block end, the cam end being constrained to follow the surface of the tilted cam, allowing a cyclic reciprocal movement of the pistons, whereby as the cylinder block rotates, the pistons reciprocate in a sinusoidal axial motion, whereby when the pistons move proximally toward the tilted cam, the block end restricts passage of the fluid through the intake port, and the cam end enables passage of the fluid through the discharge outlets, whereby when the pistons move distally from the tilted cam, the block end enables free passage of the fluid through the intake port, and the cam end restricts passage of the fluid through the discharge ports.

15. The pump of claim 14, wherein the engine comprises a diesel engine having an engine displacement of 7.3 liters.

16. The pump of claim 14, wherein the discharge ports are in fluid communication with a plurality of oil rails, the discharge ports carrying the fluid to the oil rails.

17. The pump of claim 14, wherein the angle of the tilted cam is adjustably variable.

18. The pump of claim 14, wherein the cylinder block is fabricated at least partially from a billet aluminum material.

19. A high pressure axial piston pump with multiple discharge ports, the pump consisting of:

a pump housing being defined by a central borehole, at least one intake port and two discharge ports, the intake port enabling passage of a fluid into the pump housing, the discharge ports enabling discharge of the fluid from the pump housing, the discharge ports extending along respective longitudinal axes that intersect at an angle of 122 degrees in a plane, the discharge ports in a spaced apart relationship at an external surface of the pump housing and being in fluid communication with a plurality of oil rails, whereby the discharge ports carry the fluid to the oil rails, each oil rail is in fluid communication with at least one injector of a diesel engine having an engine displacement of 7.3 liters, the pump housing being fabricated at least partially from a billet aluminum material;

a cylinder block disposed in the pump housing, the cylinder block being defined by a plurality of piston chambers arranged in a circular array around the central borehole, the piston chambers carrying the fluid between the intake port and the discharge ports, the cylinder block being fabricated at least partially from the billet aluminum material;

whereby the plane is perpendicular to an axis of rotation of the cylinder block;

a fluid supply line in fluid communication with the intake port, the fluid supply line supplying the fluid to the intake port;

multiple delivery lines in fluid communication with the fluid supply line, the delivery lines carrying the fluid from the intake port to the discharge ports;

a rotatable drive shaft concentrically disposed through the central borehole of the cylinder block, the drive shaft driving the cylinder block at variable speeds to rotate about the axis of rotation;

a tilted cam disposed in the cylinder block, the tilted cam being tilted at an angle relative to the axis of rotation followed by the cylinder block, the angle of the tilted cam being adjustably variable;

a plurality of pistons axially disposed through the piston chambers of the cylinder block, the pistons defined by a cam end and a block end, the cam end being constrained to follow the surface of the tilted cam, the pistons reciprocating through the piston cylinders in correlation with the rotational speed of the drive shaft, allowing a cyclic reciprocal movement of the pistons, whereby as the cylinder block rotates, the pistons reciprocate in a sinusoidal axial motion, whereby when the pistons move proximally toward the tilted cam, the block end restricts passage of the fluid through the intake port, and the cam end enables passage of the fluid through the discharge outlets, whereby when the pistons move distally from the tilted cam, the block end enables free passage of the fluid through the intake port, and the cam end restricts passage of the fluid through the discharge ports; and a rotary valve disposed at the block end of the pistons.

* * * * *